Mar. 20, 1923.
G. H. PHELPS.
METHOD OF FORMING CAM SHAFTS AND THE LIKE.
FILED JULY 9, 1921.
1,448,862.
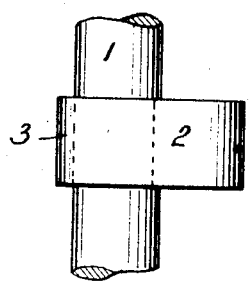
Fig. 1.
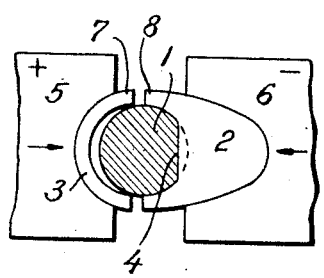
Fig. 2.
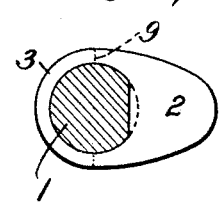
Fig. 3.
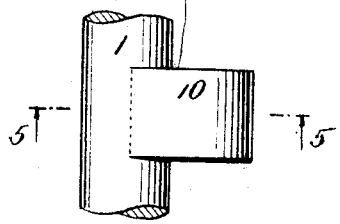
Fig. 4.
Fig. 5.
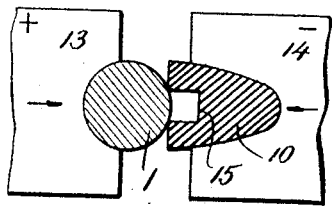
Fig. 6.
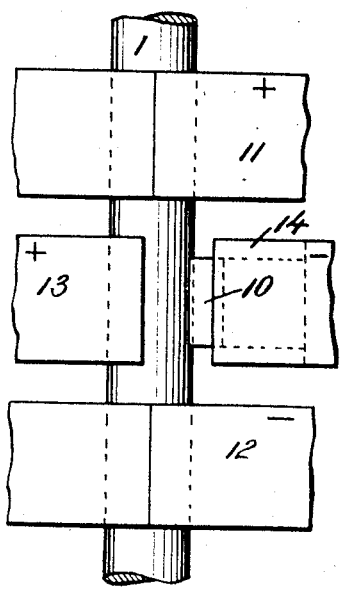
Fig. 7.
Inven
George H. Phelps
By his Attorney
D. Anthony Usina Patented Mar. 20, 1923.

1,448,862

UNITED STATES PATENT OFFICE.

GEORGE H. PHELPS, OF WAREHOUSE POINT, CONNECTICUT, ASSIGNOR TO THOMAS E. MURRAY, OF BROOKLYN, NEW YORK.

METHOD OF FORMING CAM SHAFTS AND THE LIKE.

Application filed July 9, 1921. Serial No. 483,630.

*To all whom it may concern:*

Be it known that I, GEORGE H. PHELPS, a citizen of the United States, and resident of Warehouse Point, Connecticut, have invented certain new and useful Improvements in Methods of Forming Cam Shafts and the like, of which the following is a specification.

Heretofore in order to secure cams integrally on shafts, such shafts have been generally forged to the desired shape with the cam in proper place, and various schemes have been resorted to for subsequently hardening the cams. The same principles are applicable to the provision of tappets and various other projections on the shafts.

My invention aims to provide a simple and cheap method of producing such shafts with cams, tappets or other projections thereon.

The accompanying drawings illustrate embodiments of the invention.

Fig. 1 is a plan of a portion of a cam shaft;

Figs. 2 and 3 are cross-sections illustrating successive steps in the process of manufacture of the same;

Figs. 4 and 5 are respectively a plan and cross-section on the line 5—5 of another construction;

Figs. 6 and 7 are respectively a cross-section and a plan illustrating the process of producing the same.

Referring to the drawings, the shaft 1 may be made solid or tubular and of comparatively soft steel, such as ordinary machine steel, so as to give it the toughness desired. No forging is necessary such as is required where the rods are made of high carbon steel in order to secure the proper material for the cams. A cam 2 is formed of the desired high carbon steel which best resists wear and is then welded on the shaft.

In the case shown in Fig. 1 it is desired to provide a hardened surface entirely around the shaft and for this purpose a segment 3 of suitable hard steel is mounted on the shaft at the side opposite the cam. Also this construction provides a simple method of welding. The shaft 1 is provided with a flattened face 4, or with any non-circular section, and the cam 2 is shaped to fit the shaft at this point. The segment 3 is embraced by an electrode 5 and the segment 2 by an electrode 6, and these parts are pressed together so that their edges 7 and 8 come together. The welding current is passed through them and the further pressure extrudes a quantity of metal, which causes the parts to embrace the shaft closely, and welds them firmly in place. There may also be a sufficient degree of heat developed at the lines of contact of the cam members with the shaft to weld them to the shaft. Or the conditions may be adjusted so that the only perfect welds are at the edges 7, 8, on opposite sides of the shaft.

A portion of the metal is extruded along the joint forming a burr which is afterwards finished off by cutting, grinding or similar operation. The finished product is shown in Fig. 3, the dotted lines 9 indicating the weld being imperceptible in the actual metal. The finished product is a shaft of comparatively tough steel with a cam presenting a comparatively hard surface around the entire periphery and fastened so strongly to the shaft as to withstand the repeated shocks or varying load to which it is subjected.

To produce the cam shaft of Fig. 4, a cam 10 of comparatively hard steel is mounted on the shaft in a way to leave the shaft uncovered at the back, the point only of the cam requiring to be of hard metal.

The shaft 1 is clamped, at points adjacent to the position at which the cam is to be applied, between split electrodes 11 and 12, through which a moderate current is passed so as to somewhat soften the intermediate portion of the shaft. The cam is then pressed against the side of the shaft by means of electrodes 13 and 14 bearing against the shaft and the cam respectively, while a welding current is passed through these electrodes. The electrode 13 is stationary in this case, the electrode 14 alone being advanced. By this means the hard metal of the cam is forced into the shaft and a notch 15 in the cam forms and embraces a tongue 16 of the shaft. A strongly welded joint is formed along the meeting surfaces indicated by the dotted line 17. The cam is thus held against rotation and against movement lengthwise on the shaft. A quantity of metal is extruded outward and is subsequently removed.

The product is a shaft of comparatively tough steel with a cam forged or otherwise formed from very high carbon or alloy steel of the desired hardness. No machining operation on the shaft is required.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departure from the invention as defined in the following claims.

What I claim is:

1. The method of forming a shaft with a projection which consists in forming the projection separately and forcing it on the shaft while heated to a welding temperature by the passage of an electric current.

2. The method of forming a shaft with a projection which consists in providing the shaft with a non-circular section at a portion of its length and welding a projection on such non-circular portion of the shaft.

3. The method of forming a shaft with a projection which consists in forming the projection separately in two parts and welding them together in a position embracing the shaft.

4. A shaft of comparatively tough steel having a projection made in two parts of comparatively hard steel engaging the shaft at opposite sides respectively and welded together in position to embrace the shaft.

In witness whereof I have hereunto signed my name.

GEORGE H. PHELPS.